Aug. 31, 1937. W. ROWE ET AL 2,091,396
EMBOSSED COVERING MATERIAL AND METHOD OF MANUFACTURE
Filed May 22, 1935
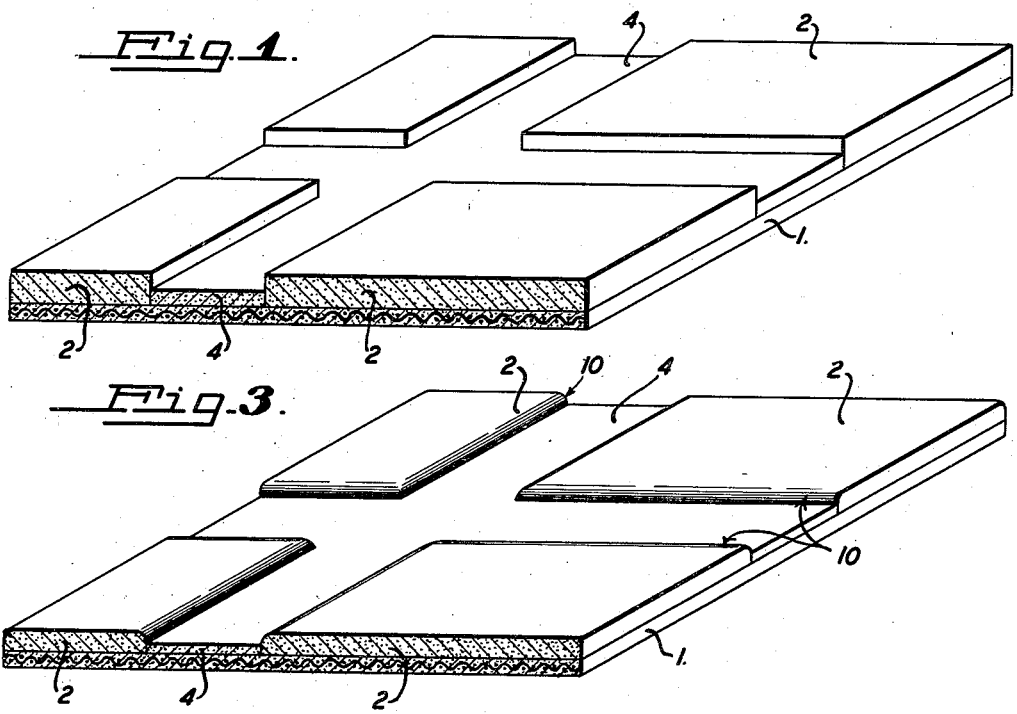
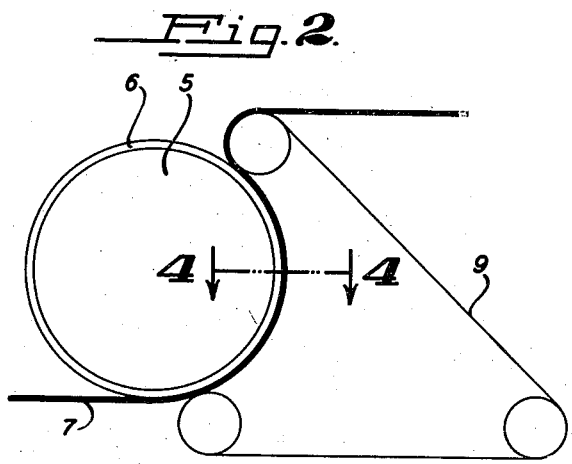
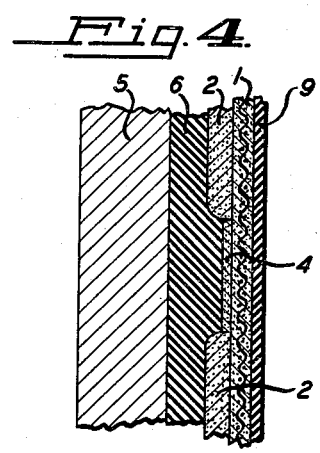
WILLIAM ROWE.
ABRAHAM BECK MILLER.
INVENTORS.
BY Lippincott & Metcalf
ATTORNEYS.

Patented Aug. 31, 1937

2,091,396

UNITED STATES PATENT OFFICE 2,091,396

EMBOSSED COVERING MATERIAL AND METHOD OF MANUFACTURE

William Rowe, Oakland, and Abraham Beck Miller, Berkeley, Calif., assignors to The Paraffine Companies, Inc., San Francisco, Calif., a corporation of Delaware Application May 22, 1935, Serial No. 22,732

3 Claims. (Cl. 154—26)

This invention relates to the manufacture of flexible covering materials of the linoleum type, i. e., materials wherein a plastic or semi-plastic coating is imposed upon a backing of treated burlap, cheese cloth, impregnated felt, or other suitable webs, and particularly to the manufacture of such materials having embossed surfaces, such as those patterns which are designed to simulate ceramic tile, wherein the tesserae representing the tiles are bounded by slightly depressed portions representing the mortar between them.

Among the objects of this invention are: To provide a method of manufacturing embossed covering materials wherein the pattern of embossing corresponds exactly with the color pattern; to provide a method of manufacturing embossed linoleum of the "straight-line" type; to provide a method of manufacturing embossed linoleum and similar covering material wherein the pattern is truly "inlaid", i. e., wherein the pigmentation of each portion of the color pattern extends entirely through the plastic layer from surface to backing; and to provide a method for manufacturing straight-line embossed linoleum which requires only minor changes in the machinery which is used to produce an ordinary level surface linoleum.

Other objects of our invention will be apparent or will be specifically pointed out in the description forming a part of this specification, but we do not limit ourselves to the embodiment of the invention herein described, as various forms may be adopted within the scope of the claims.

In the past two general methods have been used in the manufacture of embossed covering materials of the class described. In the first method a level surface covering material has first been manufactured in the usual manner, and the embossing pattern has later been imposed thereon by the use of a ribbed embossing die. Since materials of this class are flexible and elastic, it has proved difficult, if not impossible, to get exact registration between the color pattern and the embossing pattern, and the effort has been made to conceal the deviation from exact registration by forming the color pattern by means of the "molded" process, wherein the entire color pattern is first formed by applying granulated linoleum material to the backing through stencils, and later consolidating this material by pressure. The intermingling of the material of the different colors at the junction lines makes these lines somewhat irregular, and conceals slight failures to register.

The second previous method comprises the formation of a level surface material, over which are laid thin tesserae in conformity with the raised portion of the design, these tesserae then being consolidated with the underlying level-surface material by pressure. In the earlier modification of this method the underlying level surface structure was made of a uniform color corresponding with that of the depressed portions of the pattern, and the finished covering therefore did not have truly "inlaid" characteristics. This effect was overcome in the second modification of the method by making the underlying level-surface covering in a color pattern conforming to that finally desired, and then imposing thin tesserae of like color and shape to the underlying figures to form the embossing. This latter modification involves a double processing with a corresponding expense, and also the difficulty that the superimposed tesserae inevitably stretched or deformed under the consolidating pressure and therefore exact registration of the underlying and superimposed color patterns again proved difficult of achievement. It is also to be noted that in this case the raised portions of the design, although uniform in color throughout the thickness of the material, are not homogeneous, but are laminated, and it is possible that flaking-off of the upper lamina may occur when the linoleum becomes much worn.

Considered broadly our invention comprises forming the pattern from tesserae of unequal thickness, to conform to the raised and depressed portions of the pattern, either by laying up the material in the usual manner of forming straight-line linoleum or by first imposing a matrix (corresponding, preferably, to the depressed portion of the pattern) upon the backing and then fitting the thicker tesserae corresponding to the raised portions of the pattern within the interstices of the matrix. The linoleum material is then consolidated with the backing and the adjacent tesserae with each other by applying pressure thereto through a resilient pad. The pad may conveniently be of soft rubber, although other materials may be used. Examples of these are sponge rubber, artificial rubber, glue-molasses compounds such as are used in inking rollers for printing, and even fabrics such as soft, smooth-nap blankets such as are used on the press rolls of paper making machines. When any of these materials is deformed, the deformation occurs in a manner somewhat analogous to the "flow" of a liquid or semi-liquid material, but this flow is resiliently limited. The result is that the pressure is applied to both the thicker and the thinner of the tesserae of the pattern, but the greatest pressure is applied to projecting sharp corners of the thicker tesserae. These, being of uncured material and plastic, themselves flow under the pressure until they assume a curve to which the pressure is applied radially, thus causing the thicker portions of the pattern to merge gracefully with the thinner portions, while still retaining the sharp outline characteristic of straight-line linoleum materials.

Referring to the drawing:

Figure 1 is an isometric representation of a small portion of a linoleum or similar covering material, showing the tesserae of different thicknesses in place before the consolidating pressure has been applied.

Figure 2 is a schematic representation of the press used for applying the pressure.

Figure 3 is a drawing similar to Figure 1 showing the contour assumed by the tesserae of the first figure after consolidation.

Figure 4 is a fragmentary cross sectional view of the press, resilient pad, and covering material during the application of the consolidating pressure.

In connection with the detailed description to follow, it is to be noted that the term "linoleum" as used in this specification is to be construed broadly and not as limiting the composition of the materials used. Furthermore, and particularly in the claims, the term "tessera" is intended to cover all pattern elements, whether they be distinct tile-like portions, separately applied, or whether they comprise continuous reticulated or interconnecting portions applied to the backing in the form of a matrix.

The first step in the process is illustrated in Figure 1, wherein the backing 1, preferably, (although by no means necessarily) the usual treater burlap conventional in linoleum manufacture, has superimposed upon it tesserae of two different thicknesses. In the case shown the tesserae 2 may be considered as simulating ceramic tile, and are materially thicker than the tesserae 4 which represent the mortar joints between the tile.

It is immaterial to the present process how these tesserae are applied to the backing. They may be laid up by hand or by machine, although the process described in our copending application, Serial No. 22,734, filed simultaneously with this application, is particularly adapted to this use. In this related process, the thin tesserae 4 are first applied to the backing as a continuous reticulated matrix, strongly adherent to the backing and exposing the latter through the reticulations or interstices thereof, and the thicker tesserae 2 are then fitted into these reticulations.

The consolidating pressure is then applied to the entire covering by means of a press of any suitable type. In that shown in the schematic diagram 2, the roller 5 is covered with a resilient pad 6, preferably of soft rubber, although any material displaying like properties under pressure may be used. The web of linoleum 7 passes continuously through the press, being forced against the roller by the pressure belt 9.

Figure 4 is a fragmentary section, taken on the line 4—4 of Figure 2, showing the manner in which the pressure forces the pad 6 into the irregularities of the surface of the covering material, simultaneously consolidating the tesserae with the backing and each other and rounding the projecting corners 10 of the thicker tesserae. The "flow" of the pad 6 assures that the pressure is applied to all of the component tesserae, but the resilient resistance to this flow automatically and of itself assures the rounding of the corners which gives the completed covering its peculiarly pleasing appearance. Furthermore, it is the corners of the raised tesserae which are subjected to greatest wear when the covering material is in use, and these points are those which get the greatest pressure and are best consolidated.

It is to be understood that there is no necessity that the press be of the particular type shown. Any type of continuous or intermittent press may be used; the pad 6 may be applied as a blanket or a belt overlying the surface of the material and passing through the press therewith, or it may be adherent to one of the pressure members of the press as shown. It is this factor which offers one of the greatest advantages of our method, since it makes it adaptable to practically any type of linoleum-manufacturing machinery.

After being consolidated, the linoleum is subjected to such curing processes as may be requisite to the particular material used, it being obvious that the process here described and claimed is not dependent on the use of any particular compound for forming the tesserae or of any specific material as a backing.

We claim:

1. The method of making embossed coverings which comprises applying to a backing tesserae of linoleum material of varying thickness, applying a pad capable of resilient flow over said tesserae, and applying pressure to said tesserae, backing and pad to force said pad into engagement with both the thicker and thinner of said tesserae, thus consolidating all of said tesserae with said backing.

2. The method of making embossed coverings which comprises applying to a backing tesserae of linoleum material of varying thickness, applying to said tesserae a resilient pad of material which is capable of limited flow-like deformation, and consolidating said tesserae and backing by applying pressure thereto through said pad.

3. The method of making embossed coverings which comprises applying to a backing tesserae of linoleum material of varying thickness, applying a soft rubber pad over said tesserae, and forcing said pad against said tesserae with sufficient pressure to cause resilient flow thereof into the interstices between the thicker of said tesserae and into contact with the thinner thereof, thus consolidating all of said tesserae with said backing.

WILLIAM ROWE.
ABRAHAM BECK MILLER.